United States Patent
Woo et al.

(10) Patent No.: US 6,630,971 B1
(45) Date of Patent: Oct. 7, 2003

(54) MULTI-DOMAIN LIQUID CRYSTAL DISPLAY DEVICE

(75) Inventors: Joung Won Woo, Seoul (KR); Young Seok Choi, Daejon-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/541,427

(22) Filed: Apr. 3, 2000

(30) Foreign Application Priority Data

Apr. 2, 1999  (KR) .................................. 1999-11541

(51) Int. Cl.⁷ ...................... G02F 1/1333; G02F 1/1343
(52) U.S. Cl. ........................ 349/110; 349/141
(58) Field of Search ................ 349/110, 141, 349/129

(56) References Cited

U.S. PATENT DOCUMENTS

| | | | |
|---|---|---|---|
| 5,648,828 A | 7/1997 | Sakamoto et al. | 349/110 |
| 5,710,611 A | 1/1998 | Suzuki et al. | 349/129 |
| 5,781,262 A | 7/1998 | Suzuki et al. | 349/128 |
| 5,995,176 A | 11/1999 | Sibahara | 349/44 |
| 6,184,961 B1 * | 2/2001 | Ham | 349/141 |

FOREIGN PATENT DOCUMENTS

| | | |
|---|---|---|
| JP | 5-224210 | 9/1993 |
| JP | 5-232474 | 9/1993 |
| JP | 5-281545 | 10/1993 |
| JP | 7-159787 | 6/1995 |
| JP | 8-6028 | 1/1996 |
| JP | 8-146428 | 6/1996 |
| JP | 8-152635 | 6/1996 |
| JP | 8-152639 | 6/1996 |
| JP | 8-194234 | 7/1996 |
| JP | 8-201826 | 8/1996 |
| JP | 9-281497 | 10/1997 |
| JP | 63-10129 | 1/1998 |

* cited by examiner

Primary Examiner—Toan Ton
Assistant Examiner—Dung Nguyen
(74) Attorney, Agent, or Firm—McKenna Long & Aldridge LLP

(57) ABSTRACT

A multi-domain liquid crystal display device includes first and second substrates facing each other, the first substrate including a thin film transistor; a plurality of gate bus lines arranged in a first direction on the first substrate and a plurality of data bus lines arranged in a second direction on the first substrate to define a plurality of unit pixel region, the pixel region including a plurality of unit domain in a shape of stripe; a liquid crystal layer between the first and second substrates; a pair of driving electrodes driving the liquid crystal layer; and a plurality of black matrix on the region of the plurality of gate and data bus lines, the thin film transistor and on the boundaries of the adjacent unit domain in the unit pixel region, the widths of the plurality of black matrix being different one another.

14 Claims, 3 Drawing Sheets

MULTI-DOMAIN LIQUID CRYSTAL DISPLAY DEVICE

This application claims the benefit of Korean Patent Application No. 1999-11541 filed on Apr. 2, 1999 which is hereby incorporated by reference for all purposes as if fully set forth herein.

BACKGROUND OF THE INVENTION

1. Field of the Invention

The present invention relates to a liquid crystal display device (LCD), and more particularly, to a liquid crystal display device having good aperture ratio characteristics.

2. Description of the Related Art

Regarding conventional LCDs, a plurality of gate bus lines arranged in a first direction on a first substrate and a plurality of data bus lines arranged in a second direction on the first substrate divide the first substrate into a plurality of pixel regions. A thin film transistor (TFT) applies an image signal delivered from the data bus line to a pixel electrode on a passivation layer. The TFT is formed on each pixel region and comprises a gate electrode, a gate insulator, a semiconductor layer, a source electrode, and a drain electrode.

A pixel electrode is formed on the gate insulator, thereon passivation layer is formed over the whole first substrate. A side electrode is formed surrounding the pixel electrode and a part of the pixel electrode overlaps the side electrode. Alternatively, the pixel electrode is formed on the gate insulator, and passivation layer is formed over the whole first substrate.

On the second substrate, a light shielding layer (black matrix) is formed to shield any light leakage from gate and data bus lines, and the TFT. A color filter layer is formed on the light shielding layer. An over coat layer is formed on the color filter layer. A common electrode is formed on the over coat layer. A liquid crystal layer is formed between the first and second substrates. The common electrode applies an electric field to a liquid crystal layer together with the pixel electrode.

However, the black matrix as the light shielding layer used in the LCD has some problems in aperture ratio and brightness, especially in a multi-domain liquid crystal display device which is manufactured to obtain a wide viewing angle. Multi-domain means a pixel region that is divided into at least two portions and liquid crystal molecules in the liquid crystal layer in each portion that are driven differently from each other. From the above manner, a uniform viewing angle without regard to the direction of viewing angle of the users may be obtained.

The multi-domain liquid crystal display device has a boundary region between the adjacent domains. The boundary region is an area where light leaks as well in regions such as that the gate bus line,the data bus line, the TFT.

SUMMARY OF THE INVENTION

Accordingly, the present invention is directed to an LCD that substantially obviates one or more problems due to limitations and disadvantages of the related art.

An object of the present invention is to provide a black matrix to shield light according to the amount of light leakage at the domain boundary regions in a multi-domain liquid crystal display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the objects and in accordance with the purpose of the invention, as embodied and broadly described herein, a multi-domain liquid crystal display device of the present invention comprises first and second substrates facing each other, the first substrate including a thin film transistor; a plurality of gate bus lines arranged in a first direction on the first substrate and a plurality of data bus lines arranged in a second direction on the first substrate to define a plurality of pixel region, a pixel region including a plurality of domains in a shape of a stripe; a liquid crystal layer between the first and second substrates; a pair of electrodes driving the liquid crystal layer; and a plurality of black matrix the region of the plurality of gate and data bus lines, the thin film transistor and at the boundaries of adjacent domains in the pixel region, the plurality of black matrix having different widths.

The pixel region may be divided into two or four domains in the shape of a stripe and the width of the black matrix at a middle boundary and an end part of domains is wider than the width of the black matrix in the other region.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of the specification, illustrate embodiments of the invention and together with the description serve to explain the principles of the invention.

In the drawings.

DETAILED DESCRIPTION OF THE PREFERRED EMBODIMENTS

Hereinafter, the multi-domain liquid crystal display device of the present invention is explained in detail with the accompanying drawings.

Figure 1A:
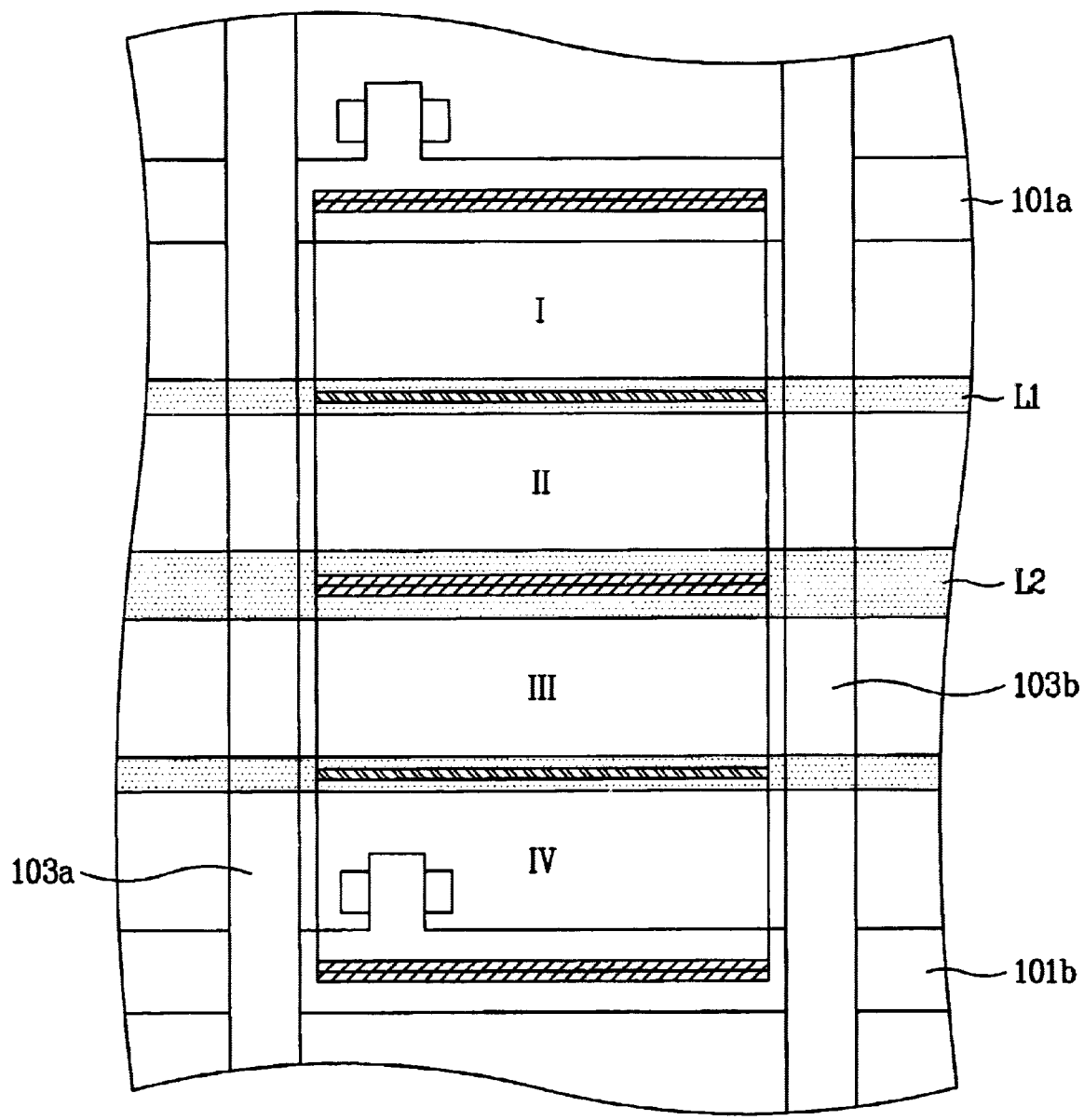
FIG. 1A is a plan view of the liquid crystal display device of the present invention.

FIG. 1A is a plan view of the 4-domain liquid crystal display device of the present invention.

Figure 1B:
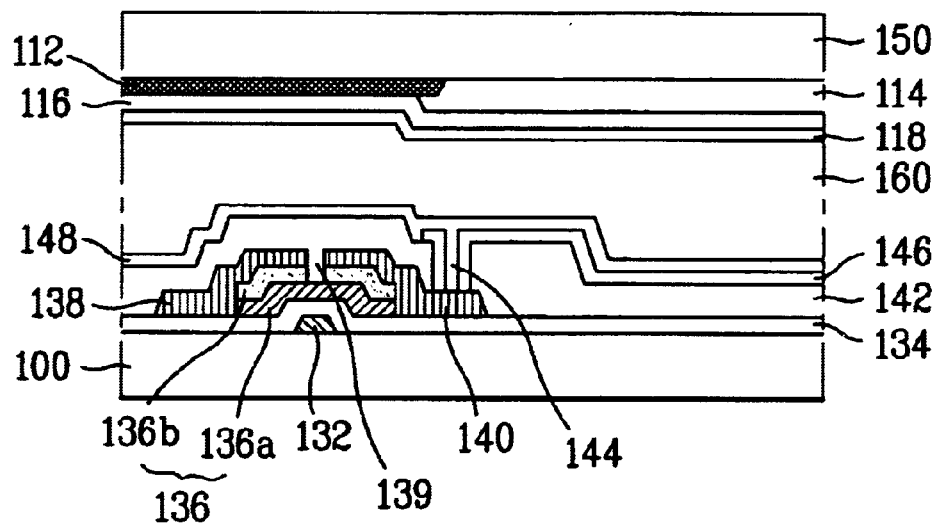
FIGS. 1B and 1C are sectional views of a liquid crystal display device of the present invention.
Figure 1C:
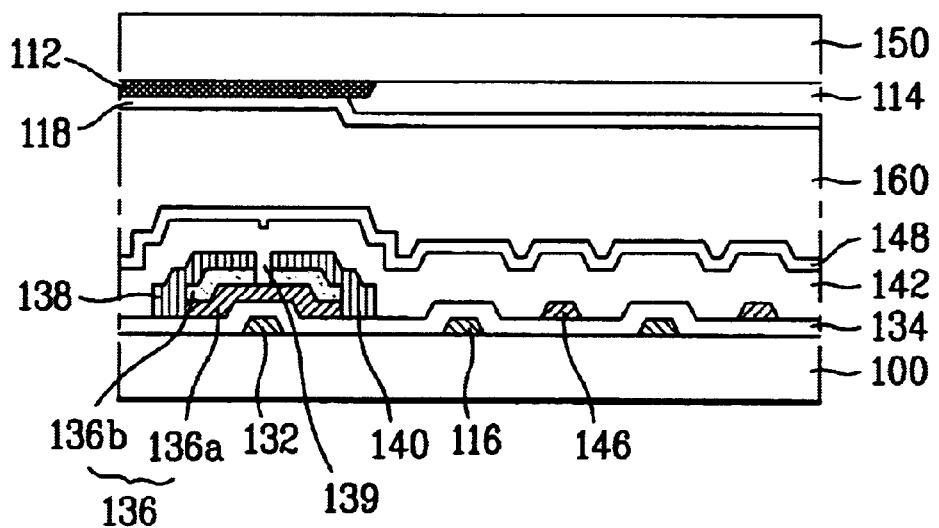

As shown in FIGS. 1A, 1B, and 1C, the present invention comprises first and second substrates 100 and 150, plurality of gate bus lines 101a, 101b arranged in a first direction on the first substrate and a plurality of data bus lines 103a, 103b arranged in a second direction on the first substrate, a TFT, a passivation layer 142, and a pixel electrode 146.

Data bus lines 103a, 103b and gate bus lines 101a, 101b divide the first substrate 100 into a plurality of unit pixel regions. The TFT is formed on each pixel region and comprises a gate electrode 132, a gate insulator 134, a semiconductor layer 136a, an ohmic contact layer 136b, and source/drain electrodes 138/140. Passivation layer 142 is formed over the first substrate 100 and the pixel electrode 146 is coupled to the drain electrode 140.

On the second substrate 150, a light shielding layer 112 is formed to shield the light leaked from gate and data bus lines and the TFT, a color filter layer 114 is formed on the light shielding layer, a common electrode 116 is formed on the color filter layer, and a liquid crystal layer 160 is formed between the first and second substrates 100 and 150.

The unit pixel region of the multi-domain liquid crystal display device according to the present invention is divided into unit domains in a shape of a stripe. The above domain division is performed by a rubbing method or a photo-alignment method. Preferably the photo-alignment treatment is used that irradiates light once on the alignment layer to determine the alignment direction or pretilt direction and the pretilt angle thereof. The light used in the photo-alignment method is preferably a light in a range of ultra-violet light, and any one of unpolarized light, linearly polarized light, and partially polarized light can be used.

In the photo-alignment treatment, it is possible to apply one or both of the first and second substrates, and to apply different alignment-treatment on each substrate.

From the alignment-treatment, a multi-domain LCD is formed with at least two domains and liquid crystal LC molecules of the LC layer are aligned differently from one another on each domain. That is, the multi-domain is obtained by dividing each unit pixel region into, for example four unit domains I, II, III, IV, for obtaining a wide viewing angle. In FIG. 1, the slashed portion represents the amount of light leakage.

The black matrices L1, L2 as the light shielding layer on the second substrate are formed in at least two patterns which are different from one another at the plurality of gate and data bus lines, the thin film transistor and the boundaries of adjacent unit domains in the unit pixel region. The black matrix includes an opaque metal or black resin, or the like, and can be formed on the first substrate.

The matrix L1 is formed on an area where the amount of light leakage is relatively small, and the matrix L2 is formed on an area where the amount of light leakage is relatively large. The width of the black matrix is preferably 20~40 $\mu$m in the area where the amount of light leakage is large, 10~20 $\mu$m in the area where the amount of light leakage is small, and more preferably 20~30 $\mu$m in the area where the amount of light leakage is large, and 5~20 $\mu$m in the area where the amount of light leakage is small.

The gate bus line 101a, 101b is also used as the black matrix, for example, in the area where the amount of light leakage is much is placed on the gate bus line which occupies extensively the thin film transistor, which obtains a good aperture ratio.

Figure 2A:
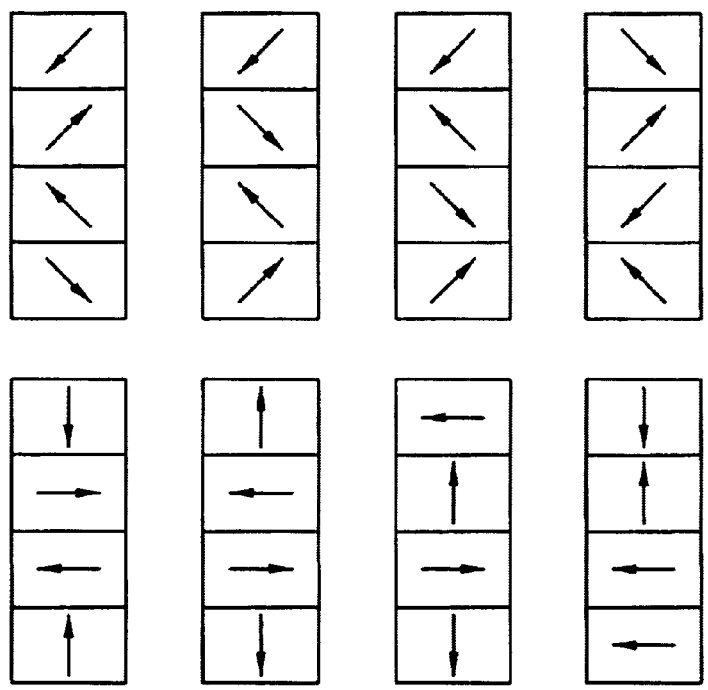
FIGS. 2A and 2B are views of showing the arrangement of domains according to the present invention.
Figure 2B:
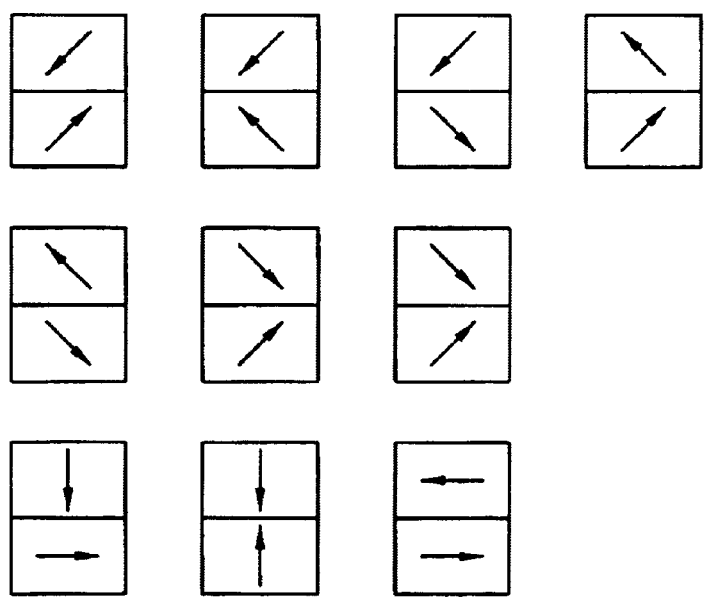

FIG. 2A shows a arrangement of four domains according to various embodiments of the present invention and FIG. 2B shows an arrangement of two domains according to various embodiments of the present invention. Here each domain is formed in a shape of stripe.

The above stripe structure has an excellent aperture ratio as compared to the conventional LCD. In the conventional LCD, the black matrices having the same widths is provided on the boundaries of domains in a pixel region, which restricts or limits the area transmitting light, to decrease the aperture ratio.

On the other hand, arranging the domains in a line as shown in FIGS. 2A and 2B, the width of black matrix can be varied to obtain good aperture ratio.

From adequately arranging the alignment direction of the liquid crystal molecules, the area where the amount of light leakage is large is placed on the middle of the pixel region and the each end part thereof, the rest boundaries are placed on the area where the amount of light leakage is small. The end part could be formed on the gate bus lines.

Consequently, since the multi-domain LCD of the present invention forms in a shape of a stripe and control of varies the width of the black matrix according the amount of light leakage, it minimizes leakage of light while improving the aperture ratio, resulting in a liquid crystal display device with a wide viewing angle, a high brightness, and a good contrast ratio.

It will be apparent to those skilled in the art that various modifications can be made in the liquid crystal display device of the present invention without departing from the sprit or scope of the invention. Thus, it is intended that the present invention covers the modifications and variations of this invention provided they come within the scope of the appended claims and their equivalents.

What is claimed is:

1. A multi-domain liquid crystal display device comprising:

first and second substrates facing each other, the first substrate including a thin film transistor;

a plurality of gate bus lines arranged in a first direction on the first substrate and a plurality of data bus lines arranged in a second direction on the first substrate to define a plurality of unit pixel regions, the pixel regions including a plurality of unit domains in a shape of stripe;

a liquid crystal layer between the first and second substrates;

a pair of driving electrodes driving the liquid crystal layer; and a plurality of black matrices on the region of the plurality of gate and data bus lines, and the thin film transistor, and on boundaries of adjacent unit domains in the unit pixel region, the widths of the plurality of black matrix being different from one another;

wherein the width of the black matrix on a middle boundary of the adjacent unit domains is wider than the width of the black matrix on the other boundaries of the adjacent unit domains.

2. The multi-domain liquid crystal display device according to claim 1, wherein the pair of driving electrodes is formed on the first and second substrates, respectively.

3. The multi-domain liquid crystal display device according to claim 2, wherein the pair of electrodes are a common electrode and a pixel electrode.

4. The multi-domain liquid crystal display device according to claim 1, wherein the pair of driving electrodes is formed on the first substrate.

5. The multi-domain liquid crystal display device according to claim 4, wherein the pair of electrodes are a common electrode and a pixel electrode.

6. The multi-domain liquid crystal display device according to claim 1, wherein the black matrix is formed on the first substrate.

7. The multi-domain liquid crystal display device according to claim 1, wherein the black matrix is formed on the second substrate.

8. The multi-domain liquid crystal display device according to claim 1, wherein the black matrix includes an opaque metal.

9. The multi-domain liquid crystal display device according to claim 1, wherein the black matrix includes black resin.

10. The multi-domain liquid crystal display device according to claim 1, wherein the width of the black matrix is 20~40 µm.

11. The multi-domain liquid crystal display device according to claim 1, wherein the width of the black matrix is 10~20 µm.

12. The multi-domain liquid crystal display device according to claim 1, wherein the unit pixel region is divided into two or four unit domains in a shape of stripe.

13. The multi-domain liquid crystal display device according to claim 1, wherein the end part is formed on the gate bus line.

14. The multi-domain liquid crystal display device according to claim 1, wherein at least one black matrix has a width in a range of 20–40 µm and another black matrix has a width in a range of 10–20 µm.

* * * * *